United States Patent Office 3,526,496
Patented Sept. 1, 1970

3,526,496
DESICCATION AND DEFOLIATION OF PLANTS
Saburo Hashimoto, Yorba Linda, and Donald C. Young and Loren L. Neff, Fullerton, Calif., assignors to Union Oil Company of California, Los Angeles, Calif., a corporation of California
No Drawing. Filed Apr. 5, 1967, Ser. No. 628,566
Int. Cl. A01n 5/00, 11/00
U.S. Cl. 71—69
9 Claims

ABSTRACT OF THE DISCLOSURE

The invention relates to desiccation and defoliation of plants by treatment with an aqueous solution of hydroxylamine or a salt thereof.

According to the invention, growing plants, such as cotton plants, are treated with an aqueous solution of hydroxylamine or a salt thereof and preferably including a surface active agent, to cause desiccation or defoliation, or both, of the plant leaves. This treatment greatly facilitates harvesting the crop.

Various concentrated aqueous solutions have been previously suggested for use as defoliants and desiccants; in particular, see U.S. Pat. 3,152,897, in which the use of ammonium salts alone or in combination with a surface active agent is disclosed and claimed for defoliation and desiccation. While the use of the conventional prior art defoliants is satisfactory under most circumstances, we have found that comparable, and under some conditions more favorable, desiccation and defoliation can be achieved by concentrated aqueous solutions of hydroxylamine or its salts. In particular, these solutions have been found to be effective at low temperatures, e.g., 50° F. or below, where many conventional defoliants are ineffective.

Gaseous materials, such as ammonia, have also been used for desiccation and defoliation; however, these materials have the disadvantages that the operator must wear a gas mask and the gas may drift toward other crops or livestock. Also, aerial application cannot be employed.

The use of aqueous solutions as defoliants and desiccants has resulted from the recent improvements in harvesting machinery which permit satisfactory crop harvesting when the plant leaves have been desiccated, even though the plant has not been completely defoliated. The application of the concentrated solution effects defoliation of some of the plant leaves and desiccation of any remaining leaves on the plant. Additionally, the use of intrinsically toxic materials such as pentachlorophenol, magnesium chlorate, etc., has fallen into disfavor because of the residual toxic effects on animals or on subsequent plantings. These materials are also unsuited for use on vegetable crops because of their hazardous nature.

We have now found that a high degree of desiccation and some degree of defoliation can be achieved by the application of concentrated aqueous solutions of hydroxylamine, its salts or mixtures thereof to the plant leaf tissue. Hydroxylamine hydrochloride and hydroxylamine sulfate have been found to be particularly effective; however, other hydroxyl amine salts such as the nitrate may also be used.

These materials are applied as aqueous solutions containing a sufficient quantity of water to achieve thorough coverage of the plant tissue. Preferably the solutions are used in combination with a surface active agent that improves the wettability of the plant leaf tissue. The dosage of the aqueous solution should be sufficient to provide between about 10 and about 200 pounds per acre of the crop under treatment; preferably between about 15 and about 60 pounds per acre. Although no particular concentration is critical, the solutions should not be so dilute that the solute is washed off the leaves. Concentrations from 10 to 45 weight percent solute are preferred. The maximum concentration of the material is not particularly limiting and even supersaturated solutions which contain suspended solute crystals can be used provided that sufficient liquid is present to adequately distribute the salt on the plant leaves. Generally, solutions or slurries containing from about 5 to about 80 weight percent solute are used with a maximum solids content of the slurries of about 20 weight percent. Preferably, however, the maximum solute content is the salting out concentration of the solution at the embient temperature to avoid the difficulties inherent in the handling of a slurry. The choice of these solution concentrations depends somewhat on the method of application since the most concentrated solutions containing from about 30 to 80 weight percent are preferred for aerial application, where the airplane's capacity generally limits the total volue of solution applied per acre to no greater than about 15 gallons per acre and frequently no greater than 10 gallons per acre. Commercial ground spray equipment does not have a limited spray capacity and therefore more dilute solutions can be effectively applied by this equipment.

Preferably a surface active agent is added to the solutions to improve their effect. The agent can be used in an amount from 0.1 to about 5; preferably from 0.5 to 2 weight percent. We have found that the presence of the surface active agent achieves a more uniform and consistent effect. Suitable surface active agents include anionic, cationic and non-ionic types. Antionic agents include alkyl aryl sulfonates such as dodecylbenzenesulfonate, sulfated alcohols and salts thereof such as oleyl and lauryl alcohol sulfates, sodium tetradecyl, heptadecyl and 2-ethylhexyl sulfates, esters of sodium sulfosuccinic acid such as sodium dialkylsulfosuccinate, sodium salts of sulfated monoglycerides such as the sodium salt of the sulfated glyceride of coconut oil fatty acids, etc.

Cationic agents include quaternary ammonium salts and salts of higher alkyl amines such as octadecyldimethylbenzyl ammonium chloride and lauryl pyridinium chloride.

Nonionic agents include ethers and esters formed by reaction of ethylene oxide with a variety of compounds such as fatty alcohols, alkyl phenols, glycol ethers, fatty acids, rosin acids, tall oil, fatty acid esters of sorbitol, fatty amides and fatty amines, e.g., the reaction product of nonyl phenol and from about 4 to 12 moles of ethylene oxide. Other nonionic agents are the fatty acid esters of polyhydroxy alcohols such as glycerol and sorbitol. Examples are glycerol monooleate, sorbitol mono, sesqui or trioleate, mono or tristearate and monolaurate or monopalmitate.

Very suitable surface active agents comprise the compounds prepared by reacting organic substituted ammonium salts of sulfodicarboxylic acids with various hydrophobic groups such as fatty acyl derivatives of alcohol amines (described in U.S. Pat. 2,976,209), fatty amines (described in U.S. Pat. 2,976,211), polyethoxylated fatty amines (described in U.S. Pat. 3,080,280) and fatty acid esters of alcohol amines (described in U.S. Pat. 2,976,208).

Preferred surface active agents are described in U.S. Pat. 3,236,626 and 3,236,627 and comprise amine salts of sulfodicarboxylic acid half esters of alkylphenoxy ethoxy alcohols. These surface active agents have the following structure:

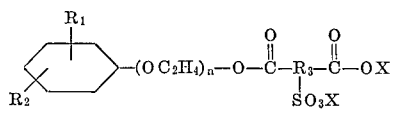

wherein:

$R_1$ is selected from the class consisting of alkyl and alkenyl groups;

$R_2$ is selected from the class consisting of hydrogen, alkyl and alkenyl groups;

$R_3$ is selected from the group consisting of trivalent sulfoalkylene and sulfo-alkenylene groups;

X is an organic aryl, alkyl and heterocyclic amine cation having from 1 to about 6 carbon atoms;

$n$ is an integer between about 2 and about 5;

and the total of carbons in any $R_1$, $R_2$, $R_3$ group is less than about 12; and preferably less than about 6.

Examples of suitable radicals from which $R_1$ and $R_2$ can be selected are the following: methyl, ethyl, propyl, isopropyl, butenyl, isobutyl, amyl, isoamyl, heptenyl, isoheptenyl, octyl, isooctenyl, nonyl, isononyl, decenyl, isodecyl, undecyl, isoundecenyl, dodecyl, isododecyl, etc.

Examples of various $R_3$ groups are the following: methylene, ethylene, propylene, isopropylene, butylene, isobutylene, pentylene, isopentylene, hexylene, isohexylene, etc.

Various organic amine cations can be used for X such as the primary, secondary and tertiary alkyl, alkaryl and aryl amines as well as heterocyclic compounds containing a basic nitrogen. Examples of suitable amines are the following: methylamine, dimethylamine, ethylamine, triethylamine, diethyl benzyl amine, propylamine, isopropylamine, diisopropylamine, ethylpropylamine, butylamine, isobutylamine, diisoamylamine, hexylamine, heptylamine, isooctylamine, benzylamine, morpholine, pyridine, etc. Preferred are the alkylamines having between 1 and about 8 carbons, e.g., isopropylamine.

Examples of various compounds useful as surface active agents in my invention are the following: half isobutyl amine salt, half tetraethoxy xylenolester of sulfo-gluteric acid; half isopropyl amine salt, half triethoxy amyl phenol ester of sulfo-adipic acid; half amyl amine salt, half pentaethoxy cresol ester of sulfo-pimelic acid; half hexylamine salt, half diethoxyoctyl phenol ester of sulfo-suberic acid; half isopropylamine salt, half diethoxy dodecyl phenol ester of sulfo-azelaic acid; half heptylamine salt, half diethoxydodecyl phenol ester of sulfo-sebasic acid, etc.

Of the aforedescribed compounds, the most preferred are those in which the total of carbons in any $R_1$, $R_2$, or $R_3$ group is less than 4 and the number of carbons in the $R_3$ group is 2 or 3. In this most preferred group, $n$ preferably equals two.

The aforementioned surface active agents are readily prepared by reacting at about 100 C. an unsaturated acid anhydride, e.g., maleic anhydride, with a hydrophobic group comprising polyethylene oxide condensate on an alkylphenol. The resultant half ester is then reacted with an organic amine to prepare the salt which is reacted in an alcohol or aqueous media at 60°–85° C. with an amine bisulfide to add the amine sulfonate group to the olefinic bond of the dicarboxylic acid. The aforementioned surface active agents are also available from the Witco Chemical Company under Emcol H2A, Emcol H3A or A140–09 designation.

The invention can be applied to a wide variety of crops to facilitate their mechanical harvesting such as cotton, potatoes, sugar beets, sugar cane, peppers, milo, flowering plants such as roses, pineapple, alfalfa, tomatoes, grapes, etc.

The following examples will illustrate a mode of practice of my invention:

EXAMPLES 1 TO 5

The test solutions were applied to plots of cotton of harvesting maturity with plants varying in height from 36 to about 72 inches. The average petiole nitrate-nitrogen content of the plants is given in Table I. The solutions were sprayed from a hand-pushed rig equipped with five 65° T-Jet nozzles. The rig had upright standards and an overhead yoke that straddled the cotton row and the 5-nozzles were placed on the rig to direct their spray to the center, thereby forming a 5-pointed star spray pattern about the cotton plants.

The test solutions were applied at the rates given in Table I and the cotton was observed for combined defoliation and desiccation after periods of from 7 to 11 days. The results are shown in Table I.

TABLE I

| Example | Solution | Petiole nitrate-nitrogen, p.p.m. | Application rate, gallons per acre | Days from application to evaluation | Effectiveness, percent | |
|---|---|---|---|---|---|---|
| | | | | | Desiccation | Defoliation |
| 1 | 20.0 wt. percent $NH_2OH \cdot HCl$, 1.0 wt. percent EmcolH3A, balance $H_2O$. | 2,002 | 20 | 11 | 90 | 20 |
| 2 | 20.0 wt. percent $NH_2OH \cdot HCl$, 1.0 wt. percent Emcol H3A, balance $H_2O$. | 500 | 40 | 11 | 90 | 10 |
| 3 | 15.0 wt. percent $NH_2OH \cdot HCl$, 1.0 wt. percent Emcol H3A, balance $H_2O$. | 500 | 40 | 11 | 90 | 10 |
| 4 | 15.0 wt. percent $NH_2OH \cdot HCl$, 1.0 wt. Emcol H3A, balance $H_2O$. | 426 | 40 | 8 | 90 | 20 |
| 5 | 15.0 wt. percent $NH_2OH \cdot HCl$, 1.0 wt. percent Emcol H3A, balance $H_2O$. | 429 | 40 | 7 | 90 | 40 |

The data of these examples demonstrate that concentrated solutions of hydroxylamine or its salts are highly effective desiccants and defoliants for mature cotton plants.

The above examples of the invention are not to be construed as unduly limiting of the invention but are intended solely to illustrate the invention and set forth the best mode of practice thereof. The invention is intended to be defined by the steps and ingredients and their apparent equivalents set forth in the claims that follow.

We claim:

1. A method of preparing plants for harvesting comprising applying to the foliage of plants of harvesting maturity an effective amount of an aqueous solution of hydroxyl amine or the hydrochloride, sulfate or nitrate salt thereof to cause desiccation and defoliation of the plants.

2. The method of claim 1 in which the solution of hydroxyl amine or salt thereof additionally contains a surface active agent.

3. The method of claim 2 in which the surface active agent is present in an amount of from about 0.1 percent by weight to 5 percent by weight.

4. The method of claim 1 in which the concentration of hydroxyl amine or salt thereof is from about 10 percent by weight to 45 percent by weight of the aqueous solution.

5. The method of claim 1 in which the plants are cotton.

6. The method of claim 1 in which the dosage of the solution of hydroxyl amine or salt thereof is from about 15 to about 60 pounds per acre.

7. The method of claim 1 in which the solute in said aqueous solution comprises hydroxylamine.

8. The method of claim 1 in which the solute in said aqueous solution comprises hydroxylamine hydrochloride.

9. The method of claim 1 in which the solute in said aqueous solution comprises hydroxylamine sulfate.

References Cited

Kretovich et al., Chemical Abstracts, vol. 55, col. 4862 (1961).

Kobyl' Skü., Chemical Abstracts, vol. 64, col. 1330(g) (1964).

JAMES O. THOMAS, Jr., Primary Examiner